United States Patent [19]
Tsuo et al.

[11] Patent Number: 5,820,838
[45] Date of Patent: Oct. 13, 1998

[54] METHOD AND AN APPARATUS FOR INJECTION OF $NO_X$ REDUCING AGENT

[75] Inventors: York Tsuo, Livingston, N.J.; Carl Johnk, Cardiff By The Sea; Yam Lee, San Diego, both of Calif.

[73] Assignee: Foster Wheeler Energia Oy, Helsinki, Finland

[21] Appl. No.: 723,226

[22] Filed: Sep. 27, 1996

[51] Int. Cl.⁶ .................................................. B01D 53/56
[52] U.S. Cl. .......................................................... 423/235
[58] Field of Search ............................................ 423/235

[56] References Cited

U.S. PATENT DOCUMENTS

| | | | |
|---|---|---|---|
| 3,900,554 | 8/1975 | Lyon ........................................ | 423/235 |
| 4,115,515 | 9/1978 | Tenner et al. ........................... | 423/235 |
| 4,181,705 | 1/1980 | Gumerman ............................. | 423/235 |
| 5,094,191 | 3/1992 | Garkawe et al. ....................... | 122/4 D |
| 5,342,592 | 8/1994 | Peter-Hoblyn et al. ................ | 423/235 |

FOREIGN PATENT DOCUMENTS

| | | |
|---|---|---|
| 0 176 293 A2 | 4/1986 | European Pat. Off. . |
| 0176293 | 4/1986 | European Pat. Off. . |
| 0497528 | 8/1992 | European Pat. Off. . |
| 38 23 035 A1 | 1/1989 | Germany . |
| 53-88655 | 8/1978 | Japan . |
| 62-84212 A | 4/1987 | Japan . |
| 1 514 529 | 6/1978 | United Kingdom . |

OTHER PUBLICATIONS

Kohl et al. "Gas Purification" 4th Edition, Gulf Publishing Co., Houston TX USA, p. 777, ISBN 0–87201–314–6, 1985 No Month.

*Primary Examiner*—Gary P. Straub
*Assistant Examiner*—Timothy C. Vanoy
*Attorney, Agent, or Firm*—Fitzpatrick, Cella, Harper & Scinto

[57] ABSTRACT

The present invention refers to an improved method and an improved apparatus for reducing the concentration of nitrogen oxides in flue gases produced by the combustion of carbonaceous fuel in combustion units having a furnace with a fluidized bed of solids therein. Hot gases produced within the furnace flow mainly upward within the furnace. Heat is recovered from the hot gases and hot solid material by heat transfer surfaces within the furnace. A nitrogen oxides reducing agent is introduced into the furnace through injection means integrally connected to the heat transfer surfaces, for keeping the temperature of the reducing agent at a sufficiently low temperature level at the introduction thereof and for efficiently mixing it with the mainly upward flowing hot gases.

14 Claims, 3 Drawing Sheets

METHOD AND AN APPARATUS FOR INJECTION OF $NO_x$ REDUCING AGENT

The present invention relates to a method and an apparatus for reducing the concentration of nitrogen oxides in flue gases produced by the combustion of carbonaceous fuel in furnaces. The present invention more particularly relates to the reduction of $NO_x$ levels in flue gases by introduction of reducing agents into flue gases. The present invention also relates to steam generation boilers, particularly circulating fluidized bed boilers, utilizing such a method and/or apparatus for improved reduction of nitrogen oxides.

BACKGROUND OF THE INVENTION

Reduction of nitrogen oxide ($NO_x$) emissions from exhaust or flue gases, before they are released into the atmosphere, has been a prolific topic of discussion in the field of environmental aspects of energy production by combustion of fuel material. Because $NO_x$ emissions are related to various environmental problems, the minimizing of $NO_x$ release from combustion systems is an ongoing concern.

It is evident that nitrogen oxide emissions result from any combustion reaction where air is present and/or the fuel used contains nitrogen. Fluidized bed combustion of fuel is a well known practice and has been found to be beneficial in reducing nitrogen oxide emissions due to its relatively low operating temperature. In fluidized bed combustion, air is typically introduced through a plenum where it is distributed through an air distribution grid. Fuel, fluidizing solids and possible sorbents, such as limestone or dolomite, are fluidized, and they react in the furnace at temperatures normally within the range of about 700°–1200° C.

Heat is recovered from hot gases and solid material if present in steam generation boilers by using heat transfer surfaces which are most often located in the combustion chamber, i.e. the furnace, and the convection section downstream the combustion chamber. In the combustion chamber heat transfer surfaces may be located on the peripheral walls, the walls then being e.g. membrane walls, and, especially when large heat transfer area is needed, also within the gas space of the combustion chamber as internal heat transfer surfaces, e.g. as wing wall tube panels or omega tube panels. The wing wall tube panels and omega tube panels are special structures which are designed to withstand harsh conditions prevailing, e.g., in the combustion chamber of a fluidized bed boiler.

Nitrogen oxides are generated during combustion of fuels as a result of thermal fixation of nitrogen in the air and the conversion of fuel nitrogen. The former reaction is favored at high temperatures (above about 950° C.) while the latter is of greater concern at lower temperatures, e.g. those generally found in fluidized bed combustion systems.

U.S. Pat. No. 3,900,554 suggests removal of nitrogen oxides from flue gases, which have exited a conventional furnace, by injecting ammonia ($NH_3$) into the effluent stream. The main problems in applying the method disclosed in U.S. Pat. No. 3,900,554 are related to ensuring that the reducing agent is sufficiently mixed with the flue gases and that it has a sufficient retention time at an optimum reaction temperature.

European Patent Application No. 0 176 293 suggests the use of $NH_3$ for $NO_x$ control in circulating fluidized bed reactors (CFB reactors) via ammonia injection into the flue gas stream immediately prior to its entry into the centrifugal separator. By this method an improved mixing of the reducing agent and the flue gases is obtained, but the retention time may still be too short. Moreover, the reaction temperature may be too low, especially at low load conditions.

It has also been suggested to provide longer retention times and higher reaction temperatures by introducing reducing agent through nozzles disposed at various locations on the walls of the furnace itself. This method, however, only allows a rather shallow penetration of the reducing agent into the furnace, and therefore, the main gas stream in the central region of the furnace is not efficiently mixed with the reducing agent. Especially in fast fluidized bed reactors, a dense layer of downward flowing solid particles tends to form close to the furnace wall. This layer prevents introduction of gas through the walls. In fluidized bed reactors there is also a potential for injected ammonium-based reducing agents, such as ammonia, to convert into $NO_x$ over the solid particles concentrated along the walls.

U.S. Pat. No. 4,181,705 suggests introduction of ammonia or an ammonia-releasing compound, in fluidized bed combustion systems, into the fluidized bed along with fuel and air used for fluidization and combustion. In this method, however, there may be a risk of too high temperatures and consequently oxidation or dissociation of the ammonia before it comes into contact with nitrogen oxides produced in the combustion process.

U.S. Pat. No. 4,115,515 teaches reduction of $NO_x$ emissions by disposing at different locations within the flue gas path a plurality of separate manifold and tubular injector structures, with spaced apertures or nozzles, for introducing ammonia. The particular location actually used for injection of ammonia has to be determined by measuring the temperature of the gases at the different locations, in order to inject ammonia at a suitable temperature and to prevent dissociation of ammonia at too high temperatures. It may, however, still be necessary to separately insulate or watercool the manifolds, tubular injectors and nozzles for the same reason. The nozzles are disposed in the injectors so as to direct ammonia counter-currently against the gas path. The whole cross section of the gas path, e.g. the convection section or the outlet of the furnace, has to be covered by nozzles to ensure efficient mixing of ammonia with the gases.

The plurality of means for injecting a reducing agent with many nozzles, traversing the flow path of the hot gases at different locations, brings a plurality of additional obstacles into the gas path, which generally should be avoided, as such obstacles are space consuming, have an influence on the gas flow, and have to be cleaned from time to time.

Heretofore, no simple and durable solution for the location of the means for injecting the reducing agent has been provided. There exists a need especially for finding an improved simple solution for the injection of the reducing agent within the furnace and for providing sufficient cooling of the reducing agent when injected.

SUMMARY OF THE INVENTION

It is an object of the present invention to provide a method and an apparatus in combustion processes for reducing nitrogen oxide emissions into the atmosphere, in which efficient reduction is achieved and the shortcomings of earlier known methods as discussed above are overcome.

It is a more specific object of the present invention to provide a solution for introducing reducing agent at an optimal temperature into hot gases within a furnace.

It is further an object of the present invention to provide a solution for efficiently mixing reducing agent into the combustion gases within a furnace.

It is also an object of the present invention to provide a less space consuming apparatus for introducing reducing agent evenly into a gas flow.

It is still further an object of the present invention to provide a system for fluidized bed steam generation boilers with improved reduction facilities for $NO_x$ emissions.

These and other objects of the present invention are accomplished by providing a method and an apparatus for introducing a reducing agent into a furnace through injection means disposed in internal heat transfer surfaces therein. The heat transfer surfaces keep the temperature of the reducing agent at a sufficiently low temperature level at the introduction thereof and provide an excellent base from which the reducing agent may be efficiently mixed with upward flow of gases within a furnace.

A method and an apparatus according to the present invention may be used for reducing the concentration of nitrogen oxides in flue gases produced by the combustion of carbonaceous fuel in combustion unit having a furnace with a fluidized bed of solids therein, where in said furnace (a) combustion reactions are maintained, resulting in the production of hot gases containing nitrogen oxides, said hot gases flowing mainly upward within the furnace;

(b) internal heat transfer surfaces are provided within the furnace for extracting heat from the hot gases and solids therein, (c) a nitrogen oxides reducing agent is introduced into the furnace, for reducing the concentration of nitrogen oxides in the hot gases, and (d) flue gas is discharged from the furnace.

The reducing agent is injected into the furnace through injection means disposed in the internal heat transfer surfaces, thereby keeping the temperature of the reducing agent at a sufficiently low temperature level, e.g. at 100°–600° C., at the introduction thereof and efficiently mixing it with the mainly upward flowing hot gases. The means for introducing nitrogen oxides reducing agent into the furnace are integrally connected to the internal heat transfer surfaces.

A steam generation boiler according to the present invention comprises a furnace having internal heat transfer surfaces with means therein for introducing the nitrogen oxides reducing agent into the furnace.

In the present invention the term "internal heat transfer surface" is used for heat transfer surfaces arranged within the gas space of the furnace. According to a preferred embodiment of the present invention, the heat transfer surfaces are surrounded at least three, preferably four (i.e. all) sides by mainly upward flowing hot gases.

The internal heat transfer surfaces include, according to a first preferred exemplary embodiment of the present invention, at least one omega panel. An omega panel is formed of parallel steam tubes stacked on top of each other and welded together to provide a mainly plane walled panel. The walls of the tubes in an omega panel typically have a mainly square or rectangular cross section with at least two opposite outer sides being parallel and plane, for forming the plane walls of the omega panel. The two other opposite outer sides of the cross section, i.e. the connecting sides of the tubes, are formed so that two adjacent tubes can be connected by these connecting sides (e.g. by welding).

The tubes in an omega panel usually have in the middle of their connecting sides a groove parallel with the tube. These grooves form, when connecting two tubes, cavities or hollow spaces therebetween, the cavities or hollow spaces parallel with the tubes.

The means for introducing a reducing agent into the furnace may, according to one embodiment of the invention, be integrated into the construction of the omega panel by providing a reducing agent supply channel in at least one cavity or hollow space between two tubes in the panel. The supply channel may include a separate tube or pipe inserted in the hollow space. Alternatively, the hollow space itself may in some applications form a supply channel.

Nozzles, apertures or opening for injecting the reducing agent into the furnace from the supply channel or hollow space may preferably be provided in the welds between two connected tubes.

The omega panels are typically mounted in the upper part of a furnace to extend from a first wall through the furnace chamber to the opposite wall. The omega panel, which is formed of parallel tubes stacked one on top of the other, is typically supported by the walls and/or other supporting means on the external side of the furnace, the tube ends extending through the walls to the external side of the furnace. The omega panels thereby form internal partition wall sections having mainly plane vertical side walls.

Preferably a plurality of nozzles are provided on each plane vertical side of the omega panels. The nozzles may be arranged in vertical and/or horizontal rows, but are preferably scattered over the panels in a pattern preventing unnecessary overlapping of injections. Typically the nozzles in a horizontal row are located at a distance of about 200–1500 mm, typically 500–1200 mm, from each other, and successive horizontal rows at a distance of about 100–500 mm. Omega panels may further have one row of nozzles on their top and bottom side respectively. Such top or bottom nozzles are provided in erosion protection layers at the top and/or bottom ends or edges of the panel.

Usually at least two vertical omega panels, formed of rows of horizontal tubes connected one on top of the other, are provided in a furnace, the panels extending e.g. from the furnace front wall to its rear wall. Two or more omega panels may be arranged on top of each other, i.e. at different vertical levels, in the furnace. Also two or more parallel omega panels may be arranged on the same vertical level at a distance from each other.

The internal heat transfer surfaces may, according to another preferred exemplary embodiment of the present invention, include at least one wing wall, where the means for introducing a reducing agent into the furnace may be integrated into the wing wall construction.

Water or steam tubes, e.g. conventional tubes with a circular cross section, are connected in a wing wall by fins to provide a wall or panel-like construction. The wing walls are usually connected by their bottom and top ends only to the furnace walls and/or ceiling. The wing wall is typically arranged perpendicularly to a furnace wall. The arrangement of the wing wall allows hot gases to pass the wing wall at at least three sides thereof. Usually there is also a space between the wing wall and the furnace wall allowing hot gases to pass the wing wall on the fourth side close to the furnace wall.

The means for introducing the reducing agent may, according to the invention, be integrated into the construction of the wing wall by connecting a supply pipe for the reducing agent to at least one of the tubes of the wing wall and parallel therewith. The supply pipe may be located between two adjacent tubes, possibly substituting a portion of the fin connecting said tubes. Openings or nozzles are then provided in the supply pipe e.g. at a vertical distance of about 100–500 mm, for injecting jets of reducing agent into the furnace.

Alternatively or additionally, a supply pipe for a reducing agent may, according to the invention, be provided within the interior of some or all of the tubes. This design is especially suitable when connecting the injection means for introducing the reducing agent with end or edge tubes of a wing wall. The supply pipe is then connected to the inner wall of the tube along connecting surfaces in said pipe and said tube respectively. Openings are provided through the pipe and the tube walls through the connecting surfaces, for injecting reducing agent from the pipe into the furnace. A supply pipe inserted into the first edge tube of a wing wall, the tube extending half way into the central region of a furnace, may be used to inject reducing agent in a direction parallel with the main plane of the wing wall still closer to the central part of the furnace.

As indicated above, the present invention provides an improved method of purifying combustion gases from a steam generation boiler, particularly of the circulating fluidized bed type. Such boilers may typically comprise a reactor chamber or furnace made of evaporating water/steam tube walls. The reactor chamber additionally includes internal heat transfer elements for extracting additional heat from the reactor chamber. Further, a flue gas convection section is operatively connected to the reactor chamber. Steam generation and purification of combustion gases comprise the steps of:

maintaining combustion reactions in the reactor chamber resulting in the production of hot gases containing nitrogen oxides;

recovering heat from the hot gases and solids within the reactor chamber by the tube walls and the internal heat transfer elements, which contain tubes for a heat transfer medium;

simultaneously reducing nitrogen oxides by bringing the hot gases in contact with a reducing agent which is injected through nozzles in injection means which are integrated in the structure of the heat transfer elements, and discharging hot flue gases from the reactor chamber, and leading them into the flue gas convection section.

One of the advantages of the present invention is that a simple and durable structure for the injection of reducing agent is achieved by integrating the injection means for the reducing agent with the heat transfer elements. No additional complicated and space consuming constructions forming obstacles in the hot gas path are needed. A further advantage is that the cooled structure prevents dissociation of the reducing agent.

Yet another advantage is that a method and an apparatus according to the present invention ensures that a sufficient mixing of the reducing agent with hot gases can be achieved, as a plurality of nozzles or apertures may easily be located so as to provide jets penetrating deep into the furnace and substantially covering the whole cross sectional area of the main hot gas stream.

The reducing agent may generally be introduced around all sides of the omega panels, in two horizontal directions and two vertical directions. Wing walls allow efficient introduction from at least three sides. Preferably at least 90% of the injection nozzles are arranged to inject the reducing agent horizontally and perpendicularly to the main gas flow. The nozzles introducing the reducing agent may further be arranged so that the total horizontal projection of the jets covers a desired portion of the horizontal cross section of the furnace. Furthermore most preferably at least 90% of the reducing agent should be introduced into the central region of the furnace, i.e. at a distance of at least 200 mm, preferably >300 mm, from an adjacent furnace wall.

A further advantage of sufficient retention time, even at low load conditions, is obtained by using injection means located in internal heat transfer surfaces at early stages of the hot gas stream, i.e. within the reactor chamber.

According to one aspect of the present invention, $NO_x$-reducing agent, such as ammonia, urea or an ammonia precursor, is injected into the hot combustion gases in the reactor chamber, i.e. the furnace, at an optimum temperature which, when using ammonia, is >700° C., preferably between 800° and 1000° C. This effects a non-catalytic reduction of nitrogen oxides in the hot gases In addition to the presently described non-catalytic NOx reduction stage, there may be a second reduction stage for catalytical reduction of nitrogen oxides, e.g. downstream of the furnace in the convection section, at a location where the temperature of the hot gases has decreased to, e.g., 175–600° C., preferably 250–500° C., by injecting $NO_x$-reducing agent, such as ammonia, urea or an ammonia producing precursor, into the hot gases.

The injection location(s) at various locations in the boiler heat transfer surfaces may be chosen according to the steam generation load of the plant, thus ensuring that a sufficiently low injection temperature and sufficient retention ti me of ammonia are maintained at all operating conditions of the steam generation boiler system. The reducing agent injection means integrated; to omega tube panels or wing wall tube panels within the reactor chamber, are especially advantageous at low load conditions, when the temperature is too low at other possible injection locations downstream of the reactor chamber.

It should be understood that any known nitrogen-reducing agent may be utilized in connection with the present invention, but preferably the reducing agent is selected from the group essentially consisting of amine-containing agents, ammonia, urea or ammonia-producing precursor.

The invention may be applied to methods and apparatus for decreasing nitrogen oxide contents in hot gases emanating from the reactions of substantially any combustible fuel, including solid fuels, sludges, gaseous fuels or the like.

BRIEF DESCRIPTION OF THE DRAWINGS

The above and other objects, features and advantages of the present invention will become more apparent from the following description, with reference to the accompanying drawings, in which.

DETAILED DESCRIPTION OF THE INVENTION

Figure 1:
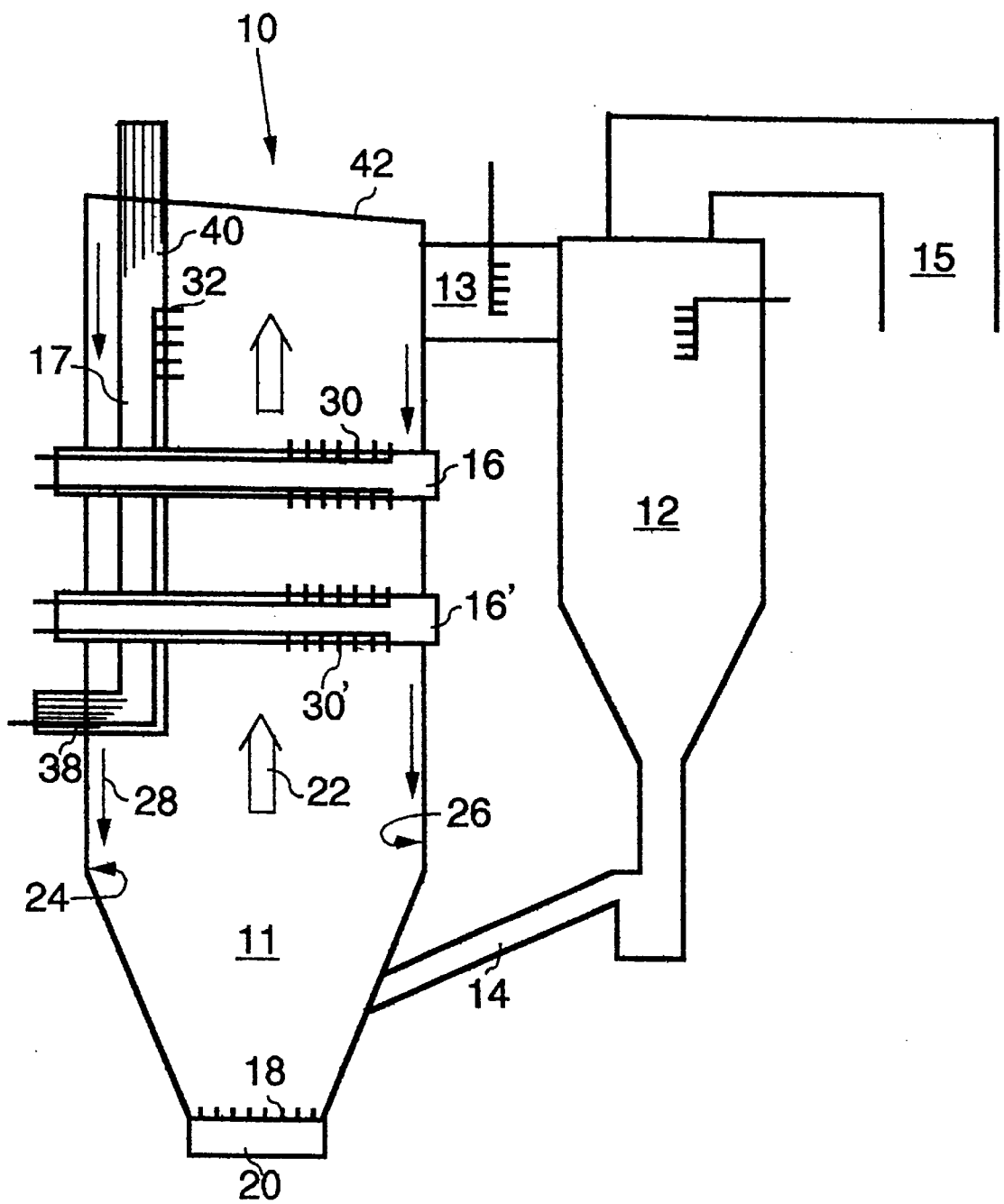
FIG. 1 is a schematic vertical cross sectional view of a circulating fluidized bed boiler for steam generation including $NO_x$ reducing facilities according to the present invention.

A preferred embodiment of the present invention is shown in FIG. 1, which depicts a steam generation boiler 10. The steam generation boiler is a circulating fluidized bed combustor with a reactor chamber or furnace 11 having a fast fluidized bed of solid particles therein. A particle separator 12 is connected through an outlet 13 to the upper part of the furnace 11 to separate discharged solid bed material from the flue gases. A return duct 14 connects the separator with the lower part of the furnace for recycling of the separated bed material. A convection section 15 is connected to the gas outlet of the particle separator 12. Internal heat transfer surfaces 16, 16' and 17 are located within the furnace for steam generation therein.

Combustible material, such as carbonaceous fuel, non-combustible bed material, such as sand, possible additives, and recirculated material are introduced into the furnace, as well as primary air and secondary air, for combustion of the combustible material. Means for introducing fluidizing gas indicated by grid 18 and windbox 20 are provided at the bottom of the furnace for fast fluidization of the bed of solid particles in the reactor chamber. The gas outlet 13 of the reactor chamber is provided in the uppermost part of the reactor chamber 11 for discharging flue gases and solid particles entrained in the flue gases from the reactor chamber. Solid particles are separated from the discharged flue gases in the particle separator 12, and the purified gas is discharged into the convection section 15. Solid particles separated from the flue gases are recirculated in a conventional way through the return duct 14 into the reactor chamber 11.

A flow of hot combustion gases and entrained solid material rises, as depicted by arrow 22, from the bottom toward the outlet 13 in the upper part of the reactor chamber or furnace 11. Some solid particles are already separated from the gases within the reactor chamber and fall downward mainly along the walls 24, 26 of the reactor chamber, as depicted by arrows 28.

The upper parts of the reactor chamber walls 24, 26 are preferably so called membrane type tube walls serving as evaporating steam generation surfaces. The lowermost parts of the walls are refractory lined. Additionally, steam generation boilers normally include different types of heat transfer surfaces, such as additional evaporators, superheaters and reheaters, which may be located within the reactor chamber itself and/or within the convection section, but which may also be located in the particle separator or in the particle return duct.

FIG. 1 illustrates two types of internal heat transfer surfaces within the reactor chamber, the so-called omega tube panels 16 and 16' and the wing wall tube panel 17. The panels are special structures designed to endure the harsh conditions in fast fluidized bed furnaces, having a hot gas/solid suspension continuously flowing past the heat transfer surfaces.

For reducing the nitrogen oxide content of the hot flue gases a reducing agent, preferably $NH_3$, is injected into the hot gases, at a temperature of >700° C., preferably between 800° and 1000° C. At such temperatures the reducing reactions between $NO_x$ and $NH_3$ take place non-catalytically, and therefore no space consuming separate large catalyst is needed.

FIG. 1 illustrates means 30, 30', 32 for introducing nitrogen oxides reducing agent integrated to an omega tube panel 16, 16' and a wing wall tube panel 17. Injection means 30, 30' are here shown as introducing reducing agent vertically upward and downward for the sake of convenience of drawing technique only. Nozzles preferably introduce reducing agent in a mainly horizontal direction. The main benefits from integrating the means 30, 30' and 32 for injecting the nitrogen oxides reducing agent to the heat transfer structures within the reactor chamber as shown in FIG. 1 are to obtain a compact, durable and cooled structure, ensuring injection at sufficient (high enough) temperatures and ensuring sufficient (long enough) retention times for the reducing agent. The cooling of the injection means is needed to prevent dissociation of the reducing agent at high temperatures.

The injection of reducing agent through internal heat transfer surfaces 16, 16', 17 into the main upward gas flow 22 also provides a better mixing of gas and reducing agent, compared to reducing agent being injected through nozzles in the furnace walls. A heavy flow 28 of solid material along the walls prevents reducing agent from penetrating deep into the furnace.

Figure 2A:
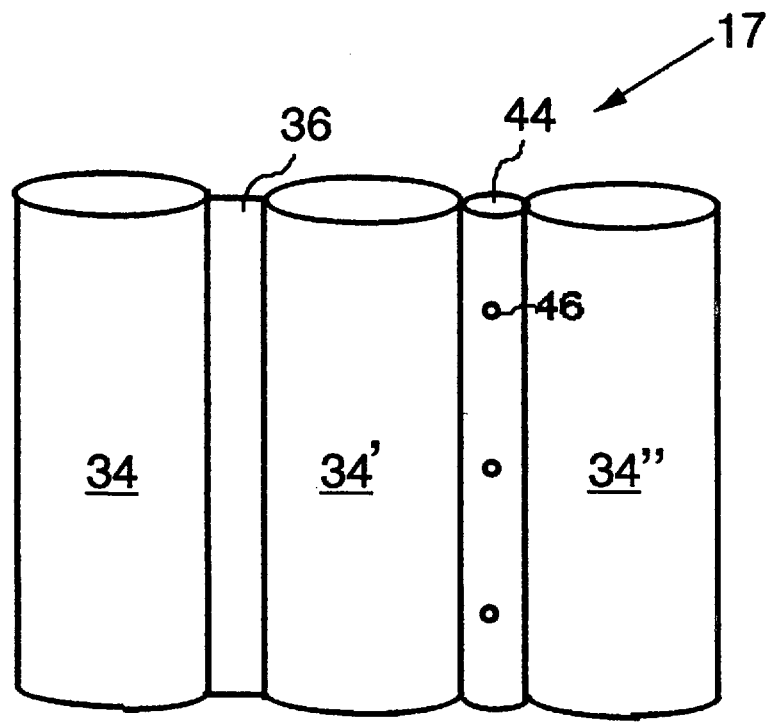
FIG. 2a is an enlarged partial view of a wing wall construction according to the present invention.
Figure 2B:
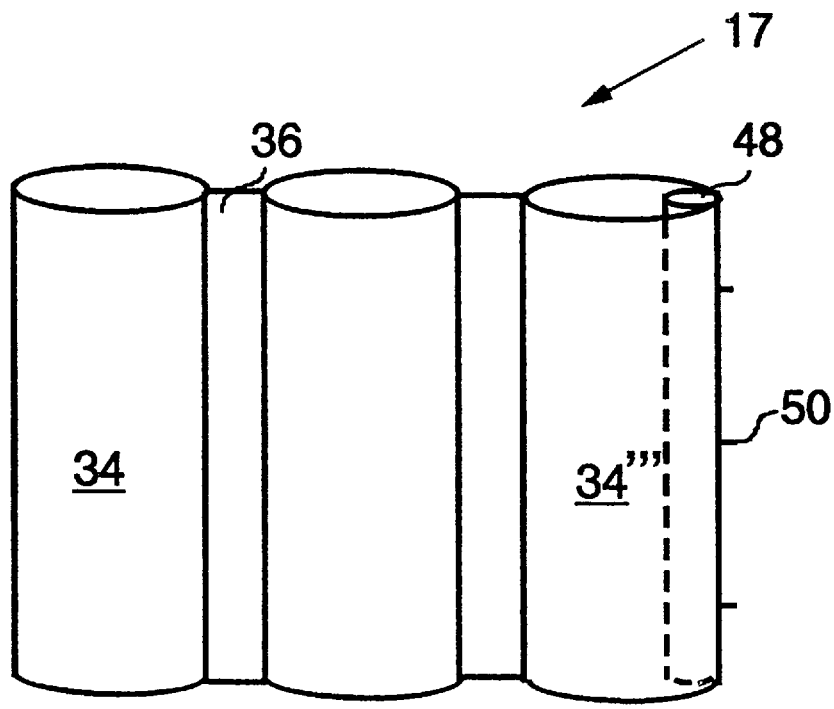
FIG. 2b is an enlarged partial view of a another wing wall construction according to the present invention.

FIGS. 2a and 2b show two additional ways of practicing the present invention when using a wing wall tube panel as a base for injection means for the reducing agent. FIG. 2a shows an enlarged view of a portion of a wing wall tube panel 17, partly in cross section. The wing wall panel 17 is constructed of parallel water or steam tubes 34 which are connected side by side to form a plate like construction. Adjacent tubes are connected by a flat metal plate, otherwise known as fin 36. The fin is welded to the adjacent tubes to provide a rigid structure. The wing wall tube panel 17 is, as shown in FIG. 1, connected at its lower end to the front wall 24 of the furnace, so that the lower portion 38 of the wing wall protrudes a certain distance of about 1–2 m into the furnace, the tubes here being mainly horizontal. The upper portion 40 of the wing wall tube panel turns upward to form a lengthy vertical panel, the tubes in this part being mainly vertical. The vertical portion of the wing wall panel extends upward and through the ceiling 42 out of the reactor chamber, to be connected to the rest of the steam cycle, e.g. to the steam drum, not shown.

FIG. 2a shows an embodiment where a portion of a fin between two tubes 34', and 34" is replaced by a supply pipe 44 for reducing agent. The pipe 44 has nozzles 46 spaced apart from each other along the pipe by means of which horizontal jets of a reducing agent can be injected into the furnace, mainly in a direction parallel to the normal of the plane of the wing wall.

FIG. 2b shows a realization where a supply pipe 48 for reducing agent is located within the first or end tube 34'" at the edge of the wing wall tube panel. The outer peripheral wall of the supply pipe 48 is tangentially connected to the inner wall of the tube 34'". Nozzles 50 are provided through the connecting surfaces of the pipe 48 and the tube 34'" for injecting reducing agent horizontally and in the plane of the wing wall from the supply pipes into the furnace.

Figure 3A:
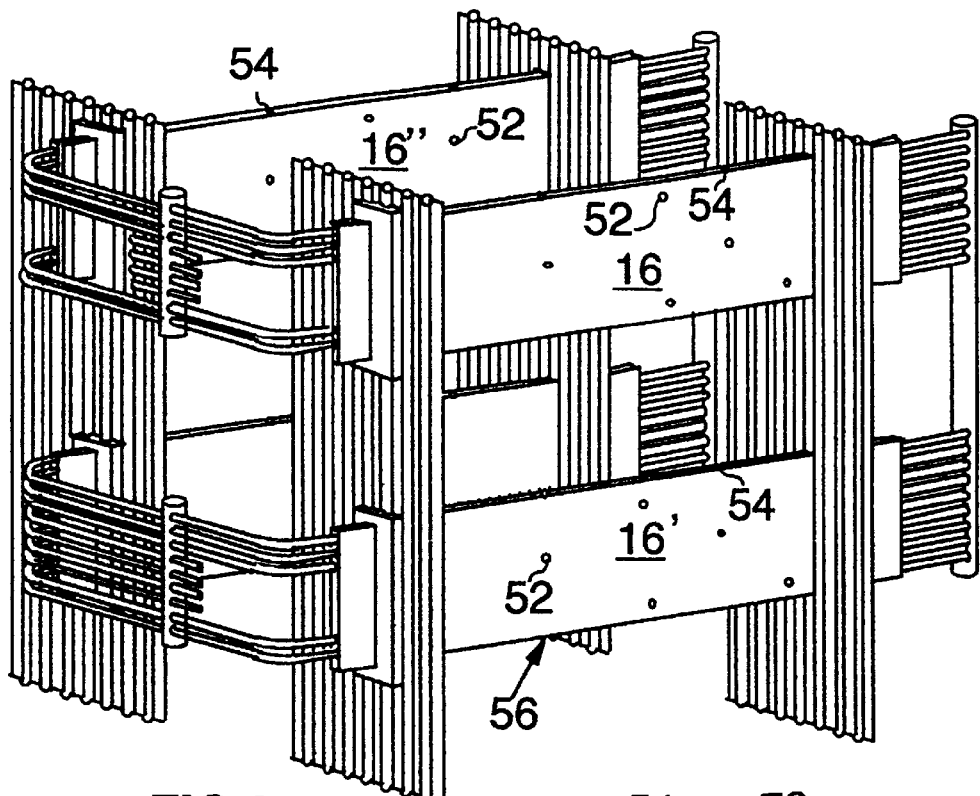
FIG. 3a is a schematic perspective view seen from the top of an omega panel tube bank according to the present invention.

FIG. 3a shows omega panels 16, 16', 16" suitable for being integrally connected with the means for injecting reducing agent. Injection nozzles 52 are shown in FIG. 3a for injection of horizontal jets of reducing agent normal to the plane of the panel. Furthermore, nozzles 54, 56 injecting reducing agent vertically upward (54) and downward (56) are shown.

Figure 3B:
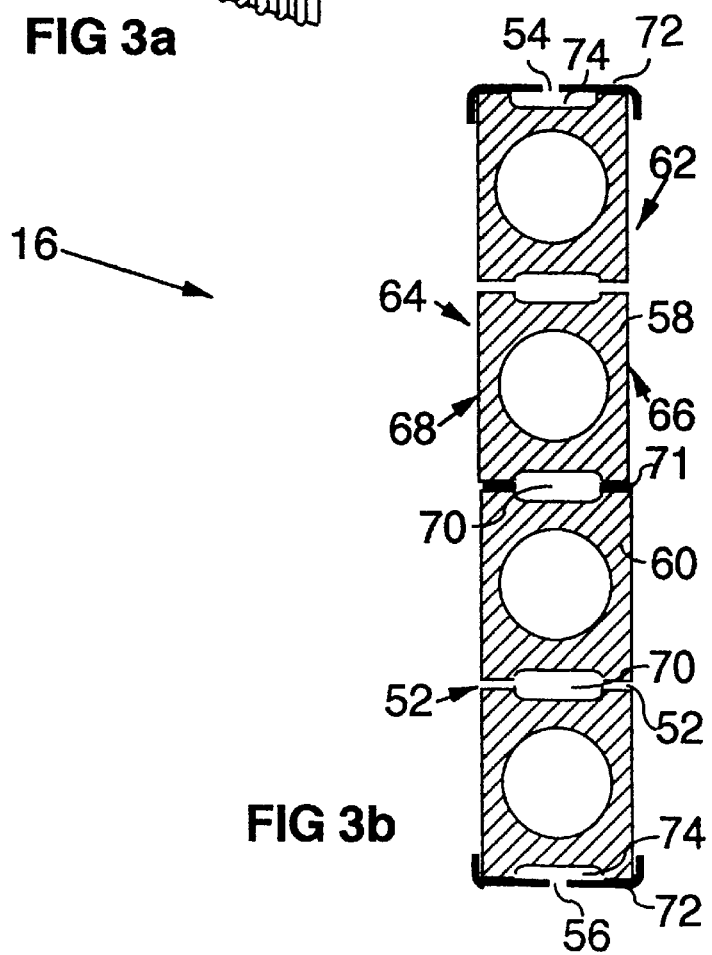
FIG. 3b is an enlarged cross sectional view of an omega tube panel.

Omega tube panels are, as can be seen in FIG. 3b, made of specially shaped tubes 58, 60 which form, when welded together, a panel structure, which is substantially even or plane walled, having two opposite planar sides 62, 64. The cross section of the tubes 58, 60 is mainly square or rectangular, and at least two opposite sides 66, 68 of each tube are planar for forming the plane walls 62, 64 of the omega panel. By this technique a structure can be made, which is durable enough to withstand highly erosive conditions, e.g. when the panel tranverses the main gas stream in the reactor chamber of a fast fluidized bed boiler.

According to an exemplary embodiment of the present invention, which is illustrated in FIG. 3b, spare cavities 70 are formed between every adjacent pair of omega tubes 58,60 connected by weldings 71. These cavities may be used as supply pipelines for reducing agent. To provide a set of reducing agent jets, a set of properly dimensioned openings or nozzles 52 are made in the weldings between adjacent omega tubes. Omega tube panels may be, as indicated by FIG. 3a, located in the reactor chamber so that their planar sides are vertical. Thus, the openings or nozzles 52 in the welding provide mainly horizontal jets of reducing agent. These nozzles provide reducing agent jets substantially perpendicular to the gas flow flowing in a mainly vertical direction along the sides of the omega tube panels.

Because the damages caused by erosive forces on omega tube panels are greatest on the top and bottom ends thereof, the ends are normally protected by shields 72. The cavities 74 between the erosion shields and the last omega tubes may also be used as reducing agent supply pipelines. Openings or nozzles 54, 56 through the shields then provide jets directed vertically upward and downward from the omega panel.

Openings or nozzles 52 may be arranged in horizontal and vertical rows in omega panels as shown in FIG. 3a. The distance between openings or nozzles may be chosen according to the need to make it possible to choose the correct temperature level for injection of reducing agent at all process conditions and to ensure a desired horizontal coverage by jets of the gas flow.

It is an important advantage of the present invention that it provides structures by which the means for injecting reducing agent can be located at a suitable location across the main gas stream within the reactor chamber, and thus, by having a plurality of nozzles in each of the injection means, a sufficient mixing between the reducing agent and the gas can be guaranteed.

Furthermore it is an important advantage of the present invention that by having the means for injecting reducing agent at different locations, also within the reactor chamber, the injection can be made at every operating condition at a sufficiently low temperature. When the supply lines for reducing agent are at high temperatures, they must be cooled to prevent dissociation of the agent. The present invention provides a new solution to locate and to cool the means for injecting reducing agent within a reactor chamber without substantially altering the form of the conventional structures present in the reactor chamber.

While the steam generation boiler has been described as a circulating fluidized bed combustor, it should be understood that the present invention may be applied in various other processes where heat is extracted from a hot gas stream containing nitrogen oxides, such as sludge or waste combustors, and that the heat transfer surfaces integrated with the supply lines for reducing agent may be located downstream of the actual combustion chamber or furnace, if needed.

It should also be understood that other modifications of the described embodiments and equivalent arrangements, included within the spirit and scope of the appended claims, are intended to be covered by the present invention.

What is claimed is:

1. A method for reducing the concentration of nitrogen oxides in flue gases discharged from a furnace of a steam generation combustion unit, the furnace containing a circulating fluidized bed of solids, combustion reactions of carbonaceous fuels in the furnace producing hot gases containing nitrogen oxides and entrained solids of the fluidized bed, the hot gases flowing mainly upwards within the combustion unit, and internal steam generation surfaces disposed in the combustion unit contacting the hot gases and the entrained solids to extract heat and generate steam from both the hot gases and the entrained solids, the internal steam generation surfaces comprising a plurality of steam generation heat exchange conduits arranged parallel to one another in a plane, said method comprising the steps of:

providing injection means for injecting nitrogen oxides reducing agent into the steam generation combustion unit, the injection means being integrally connected to the internal steam generation surfaces of the steam generation combustion unit and proximate to the plurality of steam generation heat exchange conduits;

selecting a nitrogen oxides reducing agent;

introducing the nitrogen oxides reducing agent into the injection means integrally connected to the internal steam generation surfaces of the steam generation combustion unit; and discharging the nitrogen oxides reducing agent from the injection means from within the region of the steam generation surfaces into the hot gases flowing mainly upwards within the combustion unit.

2. A method according to claim 1, wherein the nitrogen oxides reducing agent is ammonia, urea or an ammonia-producing precursor.

3. A method according to claim 2, wherein said discharging step comprises discharging the nitrogen oxides reducing agent into the hot gases within the furnace at a location where the temperature of the hot gases is greater than about 700° C., for non-catalytical reduction of nitrogen oxides contained in the hot gases.

4. A method according to claim 2, wherein said discharging step comprises discharging the nitrogen oxides reducing agent within the furnace at a location where the temperature of the hot gases is in a range between about 800° C. to about 1000° C., for non-catalytical reduction of nitrogen oxides.

5. A method according to claim 2, further comprising introducing the nitrogen oxides reducing agent into flue gases discharged from the furnace, at a location downstream from the furnace where the flue gases have a temperature range between about 175° C. to about 600° C., for catalytically reducing nitrogen oxides in the hot gases.

6. A method according to claim 5, wherein the nitrogen oxides reducing agent is introduced into the flue gases, which have a temperature range between about 250° C. to about 500° C.

7. A method according to claim 1, wherein the heat transfer surfaces are omega panels or wing walls.

8. A method according to claim 1, wherein the nitrogen oxides reducing agent is introduced into the injection means to keep the temperature of the reducing agent within a range between about 100° C. and 600° C.

9. A method according to claim 1, wherein the injection means includes a plurality of jets, of which at least 90 percent extend mainly orthogonally into the hot gases flowing mainly upwards within the furnace.

10. A method according to claim 9, wherein said discharging step comprises discharging the nitrogen oxides reducing agent from the plurality of jets of the injection means.

11. A method according to claim 9, wherein the injection means includes the plurality of jets in at least two different vertical levels and in at least two horizontally spaced apart locations in each of the vertical levels, the horizontal spacing between successive jets being a distance between about 200 mm to about 1500 mm, and a vertical spacing between successive vertical levels of jets being a distance between about 100 mm to about 500 mm.

12. A method according to claim 11, wherein the horizontal spacing between successive jets is a distance between about 500 mm to about 1200 mm.

13. A method according to claim 1, wherein the injection means is located at a distance of at least 200 mm from an adjacent furnace wall in a central region of the furnace prior to the outlet thereof, and in said step of discharging the nitrogen oxides reducing agent, at least 90 percent of the nitrogen oxides reducing agent introduced into the injection means is discharged into the hot gases within the furnace.

14. A method according to claim 13, further comprising disposing the injection means at a distance greater than about 300 mm from an adjacent furnace wall.

* * * * *